US007992882B2

(12) United States Patent
Engelman

(10) Patent No.: US 7,992,882 B2
(45) Date of Patent: Aug. 9, 2011

(54) WAGON-CAR SEAT ADAPTER

(76) Inventor: Brenda D. Engelman, Evanston, IL (US)

( * ) Notice: Subject to any disclaimer, the term of this patent is extended or adjusted under 35 U.S.C. 154(b) by 417 days.

(21) Appl. No.: 11/626,071

(22) Filed: Jan. 23, 2007

(65) Prior Publication Data
US 2008/0174155 A1 Jul. 24, 2008

(51) Int. Cl.
B62B 5/08 (2006.01)
B62B 9/12 (2006.01)
A47C 1/08 (2006.01)
(52) U.S. Cl. .............. 280/79.2; 280/47.38; 297/256.17
(58) Field of Classification Search ............ 280/79.2, 280/16, 47.38, 47.34, 647, 642, 643, 656, 280/47.25, 47.35, 650, 657, 658, 47.39; 297/256.16, 297/256.17
See application file for complete search history.

(56) References Cited

U.S. PATENT DOCUMENTS

| | | | | |
|---|---|---|---|---|
| 96,396 A * | 11/1869 | Clime | | 280/7.17 |
| 409,682 A * | 8/1889 | Higham | | 280/87.01 |
| 1,187,845 A * | 6/1916 | Kolb | | 248/102 |
| 1,650,163 A * | 11/1927 | Taylor | | 280/87.01 |
| 1,881,579 A * | 10/1932 | Hoch et al. | | 5/98.3 |
| 1,915,234 A * | 6/1933 | Magusin | | 280/30 |
| D91,862 S * | 4/1934 | Eck | | D21/425 |
| 2,595,839 A * | 5/1952 | Gellenbeck | | 280/7.12 |
| 2,676,054 A * | 4/1954 | Pasin | | 296/32 |
| 3,223,431 A * | 12/1965 | Gottfried et al. | | 280/47.38 |
| 3,351,380 A * | 11/1967 | Sprague | | 297/377 |
| 3,393,941 A * | 7/1968 | Grosfillex | | 297/440.22 |
| 3,495,845 A * | 2/1970 | Jensen | | 280/79.2 |
| 4,357,894 A * | 11/1982 | Kirk | | 114/347 |
| 4,493,488 A * | 1/1985 | Panaia et al. | | 280/42 |
| 4,613,188 A * | 9/1986 | Tsuge et al. | | 297/256.13 |
| 4,634,177 A * | 1/1987 | Meeker | | 297/256.13 |
| 4,643,280 A * | 2/1987 | Hensley | | 190/11 |
| 4,664,397 A * | 5/1987 | Reinboth | | 280/39 |
| 4,678,196 A * | 7/1987 | Van Steenburg | | 280/47.41 |
| 4,735,426 A * | 4/1988 | McConnell | | 280/87.01 |
| 4,861,105 A * | 8/1989 | Merten et al. | | 297/256.17 |
| 4,958,887 A * | 9/1990 | Meeker | | 297/256.17 |
| 5,056,865 A * | 10/1991 | Sedlack | | 297/256.17 |
| 5,277,472 A * | 1/1994 | Freese et al. | | 297/130 |
| 5,335,964 A * | 8/1994 | Sedlack et al. | | 297/256.13 |
| 5,385,387 A * | 1/1995 | Kain | | 297/256.16 |
| 5,447,354 A * | 9/1995 | Delp | | 296/104 |
| 5,499,831 A * | 3/1996 | Worth et al. | | 280/30 |
| 5,609,393 A * | 3/1997 | Meeker et al. | | 297/256.13 |
| 5,669,617 A * | 9/1997 | Pasin et al. | | 280/87.01 |
| 5,676,386 A * | 10/1997 | Huang | | 280/30 |
| 5,794,951 A * | 8/1998 | Corley et al. | | 280/30 |
| 5,820,144 A * | 10/1998 | Wang | | 280/47.38 |
| 5,833,251 A * | 11/1998 | Peck | | 280/87.01 |
| 5,915,787 A * | 6/1999 | Brookman | | 297/256.13 |
| 6,286,844 B1 * | 9/2001 | Cone et al. | | 280/47.41 |
| 6,331,032 B1 * | 12/2001 | Haut et al. | | 297/130 |

(Continued)

Primary Examiner — Terrell McKinnon
Assistant Examiner — Chiedu A Chibogu
(74) Attorney, Agent, or Firm — SNR Denton US LLP

(57) ABSTRACT

An apparatus for releasably mounting an infant carrier to a wagon includes a first member having a lower portion with a substantially U-shaped cross-section and configured to detachably engage a top portion of an end wall of said wagon, and at least one crossbar fixedly attached to an upper portion of the first member. A second member is detachably affixed in a transverse fashion between two side walls of said wagon. A distance between the first member and the second member is adjustable to suit the locking assembly arranged on the infant carrier and/or on the first and second members in order to releasably mount the infant carrier on the wagon.

4 Claims, 4 Drawing Sheets

U.S. PATENT DOCUMENTS

| | | |
|---|---|---|
| 6,375,260 B1 * | 4/2002 | Hiramatsu et al. ....... 297/256.16 |
| 6,428,099 B1 * | 8/2002 | Kain ..................... 297/256.1 |
| 6,428,100 B1 * | 8/2002 | Kain et al. ............. 297/256.16 |
| 6,446,990 B1 * | 9/2002 | Nania et al. ............. 280/47.371 |
| 6,497,423 B1 * | 12/2002 | Perelli et al. ............. 280/47.34 |
| 6,543,070 B2 * | 4/2003 | Longenecker et al. ......... 5/93.1 |
| 6,550,874 B2 * | 4/2003 | Walla et al. ............... 312/184 |
| 6,594,840 B2 * | 7/2003 | Tomas et al. ................. 5/655 |
| 6,626,452 B2 * | 9/2003 | Yang et al. ................ 280/643 |
| 6,708,992 B1 * | 3/2004 | Vargas ..................... 280/47.38 |
| 6,863,286 B2 * | 3/2005 | Eros et al. ................ 280/47.38 |
| 6,877,173 B2 * | 4/2005 | Tharalson et al. ............. 5/93.2 |
| 7,487,977 B2 * | 2/2009 | Johnson ................... 280/47.34 |
| 7,513,512 B2 * | 4/2009 | Yoshie et al. .............. 280/47.38 |
| 7,775,532 B2 * | 8/2010 | Chen et al. ................. 280/47.4 |
| 2003/0227149 A1 * | 12/2003 | Budge ...................... 280/47.38 |
| 2004/0075229 A1 * | 4/2004 | Huntley .................... 280/47.38 |
| 2005/0212234 A1 * | 9/2005 | McFarland ............... 280/33.992 |
| 2005/0242535 A1 * | 11/2005 | Chen ....................... 280/47.38 |
| 2005/0263969 A1 * | 12/2005 | Cote et al. ............... 280/33.992 |
| 2006/0131841 A1 * | 6/2006 | Huang ....................... 280/647 |
| 2008/0122191 A1 * | 5/2008 | Johnson .................... 280/47.38 |

* cited by examiner

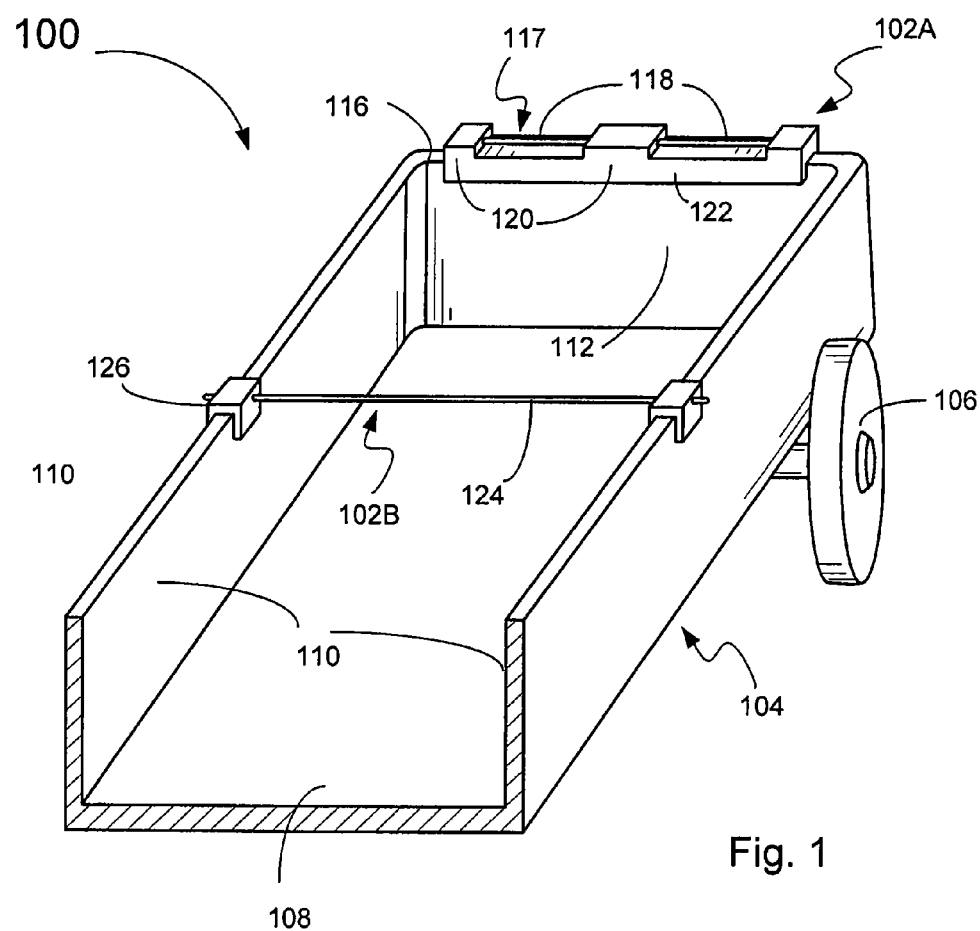
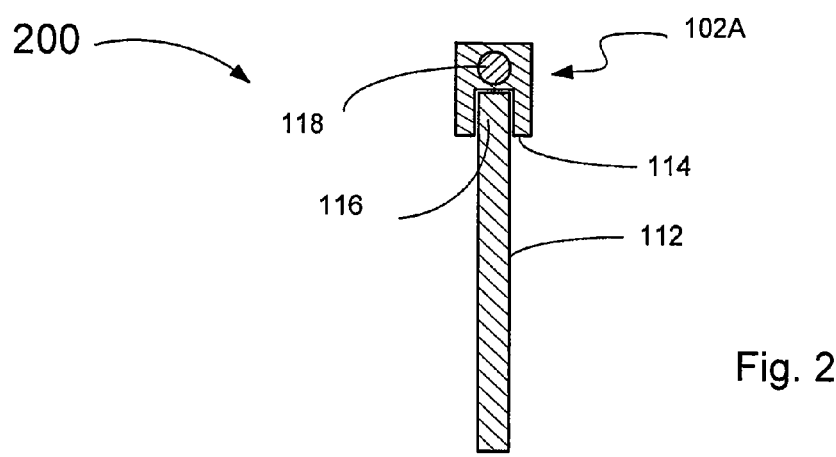

WAGON-CAR SEAT ADAPTER

FIELD

The invention relates, generally, to riding wagons and car seats for use by children and, more particularly, to a wagon-car seat adapter that enables a baby car seat to be securely attached to or readily detached from a wagon.

BACKGROUND

The increase in leisurely treks of parents in and about neighborhoods and parks with their children has brought forth the need for safe and convenient transportations for toddlers as well as for babies or infants in and out of cars. In addition to the baby car seat which safely seats or supports the baby in the car, parents typically use a baby stroller to conveniently and safely transport their baby during these leisurely treks, errands or the like outside of the car. When young children or toddlers accompany their parents and baby siblings on treks outside of the car, these toddlers typically prefer to ride in a wagon. However wagons are not designed or configured to accommodate both a baby in a baby car seat and a toddler. As such, parents end up using both a wagon and a stroller for transporting the toddler and the baby, respectively, when strolling in neighborhoods or parks.

In addition, this duplication in modes of transportation, wagon and stroller, typically involves or requires the participation of a couple of parents or adults to pull or push the wagon and stroller separately.

Many riding or pull wagons have been designed in the past. However, none are available that can accommodate and restraint both a toddler and a baby in his/her car seat. In the eventual situation that a baby car seat is rested on an inside floor surface of the wagon, the baby car seat can slide forwardly or rearwardly or to either side of the wagon when the wagon is suddenly moved or sharply turned in direction. As conventional baby car seats have rounded a bottom, to permit rocking of the baby, such sudden movement of the baby car in the wagon seat may lead to the baby sliding or falling out of the wagon.

Therefore, a need exists for a wagon-car seat adapter that remedies the problems noted above and others previously experienced for transporting a baby in a wagon. These and other needs will become apparent to those of skill in the art after reading the present specification.

SUMMARY

The foregoing problems are solved and a technical advance is achieved by the present invention. Articles of manufacture consistent with the present invention provide an apparatus for releasably mounting an infant carrier to a wagon. The apparatus includes a first member having a lower portion with a substantially U-shaped cross-section and configured to detachably engage a top portion of an end wall of said wagon, and at least one crossbar fixedly attached to an upper portion of the first member. A second member is detachably affixed in a transverse fashion between two side walls of said wagon. A distance between the first member and the second member is adjustable to suit the locking assembly arranged on the infant carrier and/or on the first and second members in order to releasably mount the infant carrier on the wagon.

In one implementation, the second member has a U-shaped configuration and a free end of each of lateral branches of the second member pivots around a pin attached to a side wall of the wagon. Each side wall of the wagon has a row of downwardly holes so as to receive lateral branches of the U-shaped second member.

Other systems, apparatus, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 1 is a perspective view of one embodiment of a wagon-car seat adapter positioned on a wagon in accordance with the present invention;

FIG. 2 is a cross-sectional side view of a member of the of the wagon-car seat adapter of FIG. 1 adapted to engage the wagon in accordance with the present invention;

DETAILED DESCRIPTION OF THE DRAWINGS

Figure 3:
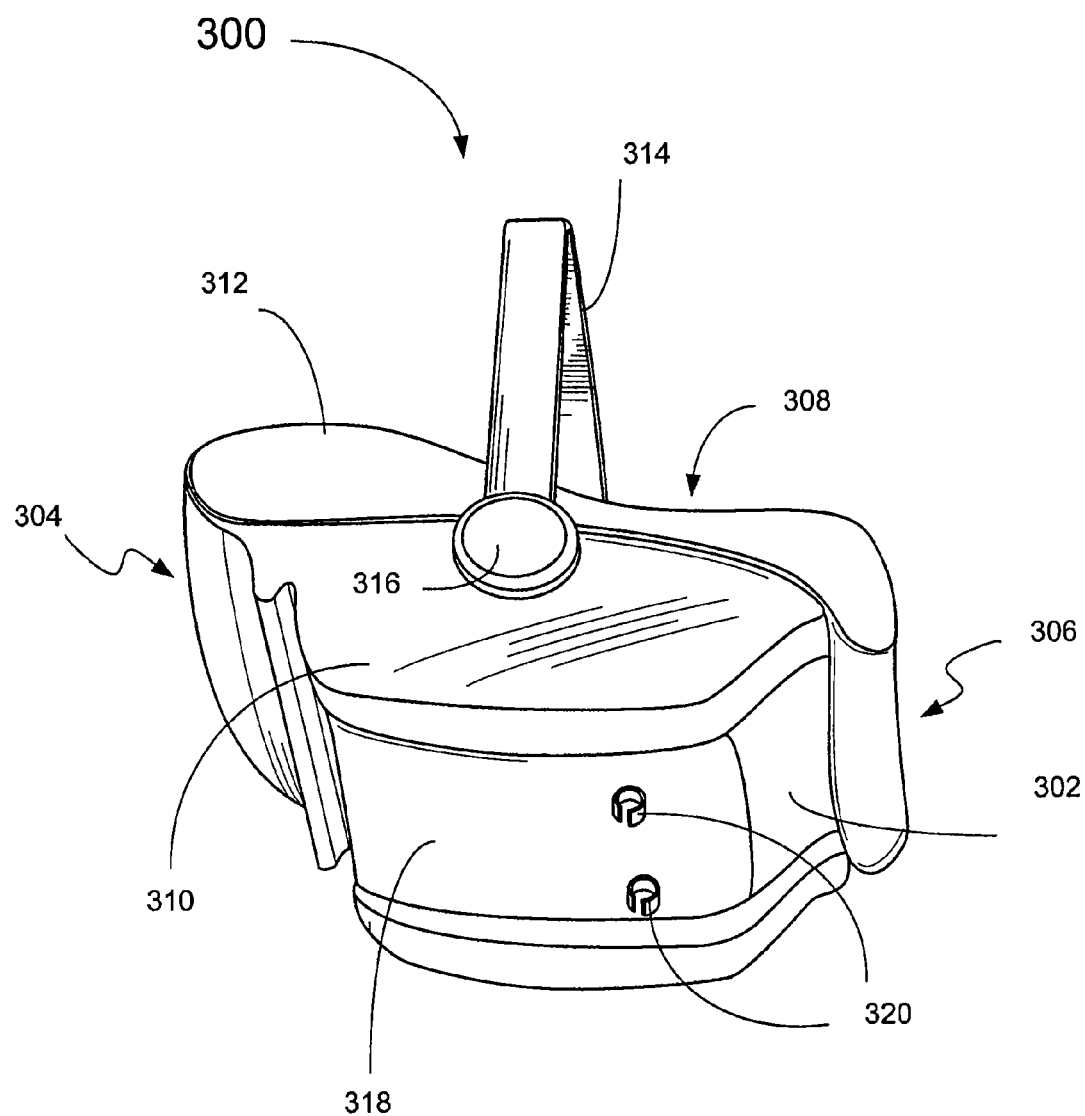
FIG. 3 is a perspective bottom view of a baby car seat configured to be received by the wagon-car seat adapter of FIG. 1 in accordance with the present invention.

Reference will now be made in detail to implementations consistent with the present invention as illustrated in the accompanying drawings. Wherever possible, the same reference numbers will be used throughout the drawings and the following description to refer to the same or like parts. As would be understood to one of ordinary skill in the art, certain components or elements for attachment of the wagon-car seat adapter to the wagon are not shown in the figures or specifically noted herein to avoid obscuring the invention.

Because wagons and infant carriers or car seats are well-known, the present description will be directed in particular to elements cooperating directly with, or forming part of, a wagon in accordance with the present invention. It is to be understood that elements not specifically shown or described may take various forms well-known to those skilled in the art.

Referring now to FIG. 1, an embodiment 100 of a wagon having a wagon-car seat adapter or apparatus 102 attached on the wagon 100 is illustrated in accordance with the present invention. A wagon body 104 may be made of molded hard plastic, metal or wood, so to be inexpensive in manufacture is mounted upon a pair of rear wheels 106 and a pair of front wheels (not shown). The pair of front wheels may be directionally turnable on a post (not shown) and to which a telescopically adjustable handle (not shown) is attached for a person to pull the wagon 104.

The wagon body 104 includes a bottom wall 108, opposite side walls 110 and opposite end walls 112 (only one of which is shown). One or two seats (not shown) may be integrally built in the bottom wall 108 for toddlers to ride in the wagon 100. Each seat may include a backrest (not shown) and a safety belt (not shown) fitted with an adjustment buckle and attached to the seat for restraining the child.

Referring now to FIGS. 1 and 2, the wagon-car seat adapter 102 comprises two members 102A and 102B. This adapter 102 is configured for easy install and removal from a wagon, and low in cost of manufacture. The first member 102A is provided to be detachably affixed to one of the end walls 112, and the second member 102B to be detachably affixed in a transverse fashion to the two side walls 110. During installation of the adapter 102, a longitudinal distance between the two members 102A and 102B may be need to be adjusted to match a spacing dictated by a locking mechanism of the infant carrier to be received in the wagon 102.

The first member 102A is an elongated element, having a lower portion 114 with a substantially U-shaped cross-section, configured to slidably engage a top portion 116 of the end wall 112. Once engaged with the end wall 112, the first member 102A may be securely affixed to the top portion 116 via any conventional fasteners (not shown), such as screws, clamps, rivets or the like. The first member 102A, which may be made of molded hard plastic or any other suitable material, is shown having a notch patterned top portion 117 and rods or crossbars 118 that bridge upward projections 120 of the notched top portion 117. Of course, the first member 102A may also have an undulated or serpentine-like upper contour that eliminates sharply angled edges. These rods 118 are preferably made of metal or any other hard material capable of securely supporting the infant carrier while transporting the infant within. As shown, both extremities of each one of the rods 118 are securely embedded or captured in the corresponding projections 120 provided at both ends and in the middle of the adapter 102. Alternately, only one rod or crossbar 218 may be used with the adapter 102, as shown in FIG. 4, that connects the two projections 220 positioned at either end of the adapter 102.

Referring to FIG. 3, a baby car seat or infant carrier 300 is typically fabricated with a monocoque construction of a rigid impact resistant, high polymer plastic such as polyethylene, polyvinyl, pressed metal, or the like. The infant carrier 300 includes a main body portion or shell 302 extending from a head end or front portion 304 to a foot end or rear portion 306 and is constructed of a length greater than a length of the infant to be supported therein. The main body portion 302 is contoured along its length in serpentine fashion for greater child comfort, and includes a seating portion 308 for supporting and retaining the infant within the infant carrier 300. Side walls 310 extend upwardly from both side edges of the seating portion 308 to restrain the infant against lateral movement. A soft pad 312 may be utilized upon which the infant may be placed for greater comfort. Elongated aperture may extend through the main body portion 302 and pad 312 for the passage of a belt, belts or straps (not shown) having a releasing mechanism for securing the infant within the infant carrier 300 in the conventional manner. The infant carrier 300 may be provided with a handle 314 in an inverted U-shaped configuration. The handle 314 may be coupled to the infant carrier 300 by rotatably lockable mechanisms 316 attached to sidewalls 310 of the infant carrier 300 and to end portions of its lateral branches.

Figure 4:
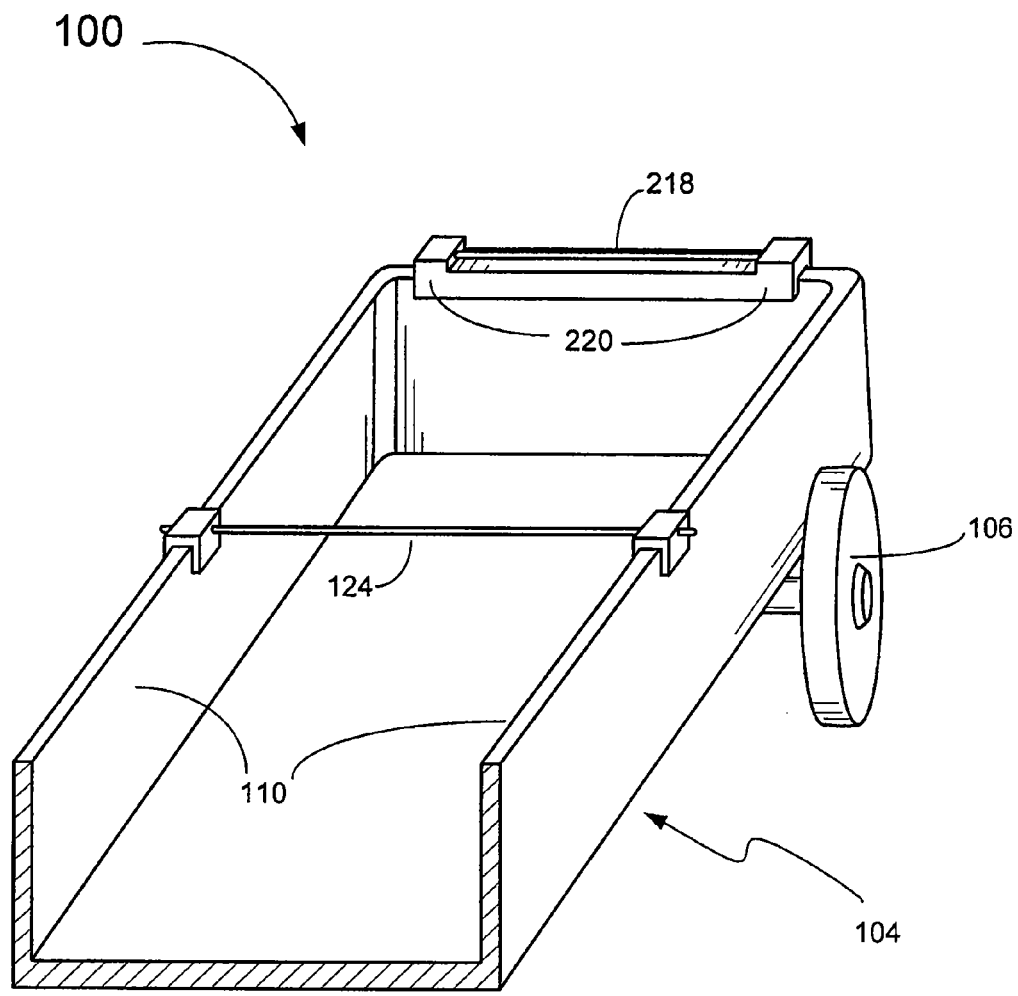
FIG. 4 is a perspective view of another embodiment of a wagon-car seat adapter consistent with the present invention.

Referring to FIGS. 1 and 4, the second member 102B is shown positioned in a transverse fashion between the two sidewalls 110 of the wagon 104. The second member 102B includes a rod or crossbar 124 that is affixed to the two sidewalls 110 via attachments 126. The attachments 126 may be clamps or the like operatively configured to hold the second member 102B in the desired transversal position relative to the length of the wagon 104. As stated above, the position of the second member 102B may be adjusted relatively to the first member 102A so as to match a spacing dictated by a locking mechanism of the infant carrier 300 to be received in the wagon 104.

In one embodiment, the adapter 102 may be formed of 3 independent parts. That is, the first member 102A may be comprised of two independent parts (not shown) that can be individually and separately affixed to the end wall 112. In another embodiment, the adapter 102 may be manufactured as a one-piece assembly. That is, the first and second members 102A and 102B may be physically linked to one another by rods (not shown) that need to be spaced apart along the width of the wagon 104 so as to prevent any installation interference of the infant carrier 300 onto the wagon 104. These linking rods may be held in adjusted relation between the first and second members 102A and 102B within a longitudinally apertured member by a set of screws which are screw threaded into the longitudinally apertured member so that the set screws may intersect the linking rods to secure them against longitudinal movement thereby to form an adjustable linkage. Moreover, when the longitudinal distance between the first and second members 102A and 102B requires adjustment to match a spacing dictated by the locking mechanism of the infant carrier 300, the linking rods may be telescoped in relation to each other by loosening the set of screws. Further, the linking rods may have out-turned ends to prevent accidental disassembly of the linking rods with respect to the longitudinally apertured member.

In order to utilize the adapter 102 to securely attach the infant carrier 300 onto the wagon 104, the infant carrier 300 may need to have a locking mechanism that engages at least one of the first and second members 102A and 102B while resting or balancing on the other unengaged member. The locking mechanism may be anyone of the conventional attachments, latches, or the like.

In one example, the locking mechanism of the infant carrier 300 may include a resilient cantilever (not shown) extending into and movable within an opening formed into a bottom wall 318 of the infant carrier 300. In order to employ this cantilever locking mechanism to attach the infant carrier 300 onto the wagon 104, after resting or balancing the front portion of the infant carrier 300 onto the second member 102B, the rear portion 306 of the infant carrier 300 is snapped downwardly such that the cantilever mechanism engages the horizontal rods 118 of the first member 102A. As such, the rods 118 exert force that moves a resilient element of the locking mechanism inwardly towards the bottom wall 318 of the infant carrier 300.

In order to remove the infant carrier 300 from the wagon 104, the user lifts the infant carrier 300 such the horizontal rods 118 exert a force in the opposite direction than that discussed above in relation to the attachment process. As such, the resilient element of the locking mechanism is moved outwardly from the opening so as to disengage the rods 118.

In another example, the locking mechanism of the infant carrier 300 may include at least one pair of spaced apart, axially aligned spring clips 320 secured thereto. Each of these spring clips 320 is preferably covered with plastic or elastomer covering so as to increase a friction when one of the clips 320 is attached to one of the rods 118 of the adapter 102. Each of these spring clips 320 is arcuate and of more than 180 degrees, and has an opening between the lips thereof of sufficient width to enable the ready insertion onto and the removal of the clip 320 from one of the rods 118.

To install the infant carrier 300 onto the wagon 104, the user need to check whether the spring clips 320 are provided only at the head end or at both the head and foot ends of the infant carrier 300 so as to adjust accordingly the distance between the two members 102A and 102B. Once the checking is completed, and in the situation where only one pair of spring clips 300 is provided near the foot end 306 of the infant carrier 300, the user moves the infant carrier 300 over the wagon 104 until the spring clips 320 fit onto the end wall rods 118 in engaged relation. The horizontal rods 118 are thus stably received within the spring clips 320. With the infant carrier 300 in the position attained above on the wagon 104, the infant carrier 300 may be further secured to the wagon 104 via the seat belt provided in the bottom wall 108 of the wagon 104. Subsequently, the infant may be placed on the infant carrier 300 so that preferably the infant head is in a somewhat elevated position and the infant feet resting against or on the foot end portion 306 of the infant carrier 300. The infant is then secured within the infant carrier 300 via the carrier seat belt to enable the wagon 104 to be pulled while inhibiting the infant from falling or sliding from the carrier 300.

Figure 5A:
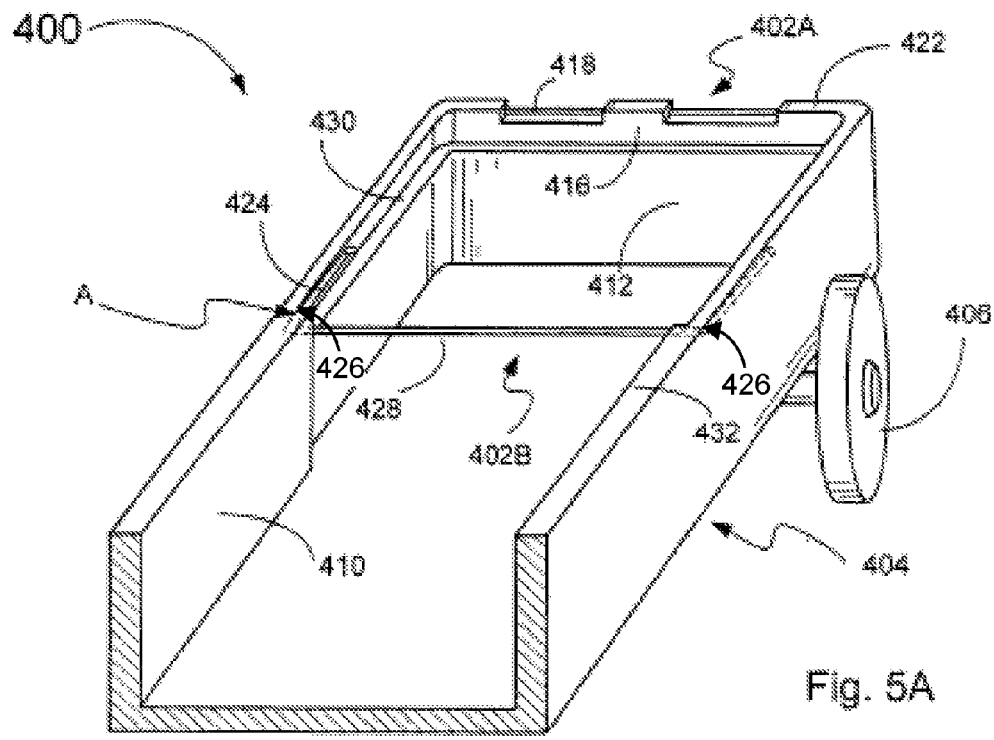
FIGS. 5A-B are two perspective views of an embodiment of a wagon configured with a integral wagon-car seat adapter in accordance with the present invention.
Figure 5B:
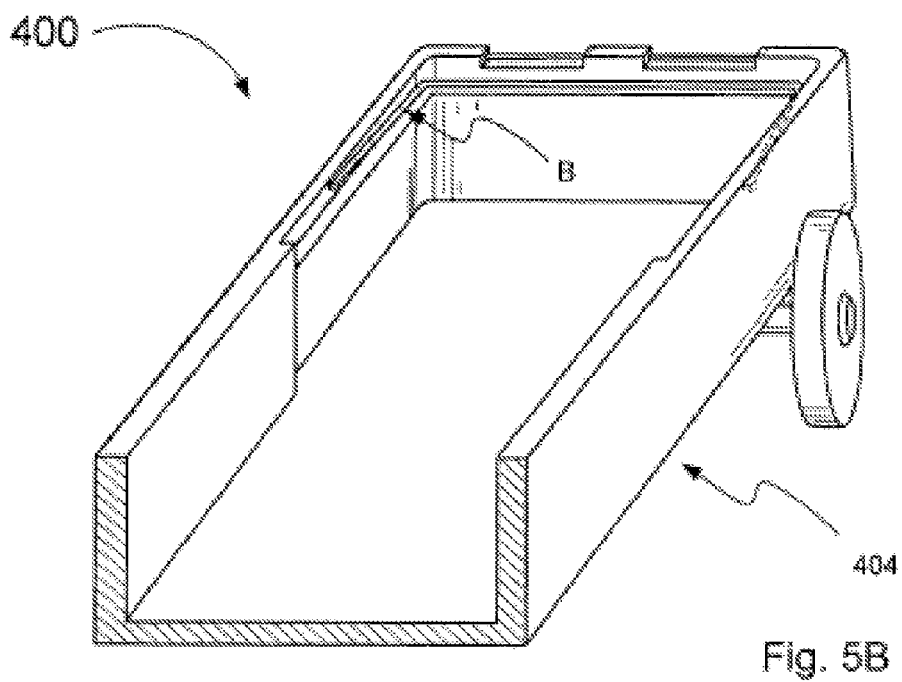

Now referring to FIGS. 5A and 5B, another embodiment of the wagon 104 is illustrated with the adapter 402 being at least in part integral to the wagon 104. As shown, the top portion 416 of the end wall 112 has a notch pattern and rods 418 connecting the elevated middle portion 420 to the side ends 422 of the top portion 416 of the end wall 112. As such, this notched top portion 416 replaces the above discussed first member 102A that requires attachment to the top portion 116 of the wagon 104. The wagon 404 is further provided with a side wall edge 430 and horizontal projections 434 formed on the side walls 410 vertically above the side wall edge 430.

In FIG. 5A, another embodiment of the second member 102B, hereafter referenced as 402B, is illustrated as having an inverted U-shaped configuration. The second member 402B has two lateral branches 424 and a cross piece or rod 428 that connects first ends of the lateral branches 424. Each of the lateral branches 424 has a second end that is rotatably coupled to the wagon 404 so that the second member 402B is adapted to rotate between a first position A and a second position B. In one implementation, pins 426 or the like extend through sidewalls 410 of the wagon 404 and through second ends of the lateral branches 424.

Alternately, the second member 402B may have out-turned second ends that may be inserted into horizontal holes (not shown) formed into the side walls 410 of the wagon 404. With the second ends inserted into the sidewall holes of the wagon 404, the second member 402B is operatively configured to be biased against the wagon 404 to prevent accidental dislodgement of the second ends while enabling its rotation between the first position A and the second position B.

Still in FIG. 5A, the second member 402B is shown resting the side wall edge 430 in locked position A, which is utilized when the infant carrier 300 is to be installed on the wagon 404. The second member 402B may be operatively locked in position A because the horizontal projection 434 prevents substantial vertical movement of the second member 402B unless a force is exerted by the user to move the second member 402B passed the projection 433 in either rotational direction.

In FIG. 5B, the second member 402B is shown resting in locked position B when the wagon 404 is freed up to transport toddlers sitting on the bottom wall 408 of the wagon 404. Thus, the second member 402B may be pivoted from position A to position B and vice versa to suit the intended usage of the wagon 404. Moreover, the lateral branches 424 may have telescopically adjustable lengths to accommodate a plurality of locking mechanisms.

Alternately, the wagon 404 may be configured with a plurality of holes (not shown) provided on the top end surfaces 432 of both side walls 410 so as to receive within the lateral branches 404 of the second member 420B. That is, each side wall 410 is provided with a row of downwardly holes. As such, different holes may be used to accommodate spacing between the second member 402B and the end wall 412 that is dictated by the locking mechanism of the infant carrier 300 to be installed on the wagon 404. Plugs (not shown) may be supplied to close these downwardly holes when the second member 402B is removed from the wagon 404 and not used for support of the infant carrier 300.

Additionally, one or both side walls 410 may be configured to provide storage space (not shown) to stow away the second member 402B when not in use. Moreover, a cover (not shown) that may snugly fit over the notched top portion 416 of the end wall 412 may also be provided so as to prevent any chances of toddlers getting their fingers wedged in the space between the rods 418 and the top portion 416, when the infant carrier 300 is not installed on the wagon 404.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

The invention claimed is:

1. An apparatus for releasably mounting an infant carrier to a wagon having a bottom wall, sidewalls supported at opposite lateral edges of the bottom wall and end walls supported at opposite end edges of the bottom wall, the apparatus comprising:
    a first securing unit having a lower portion with a substantially U-shaped cross-section that detachably affixes to a top portion of one end wall of said wagon, and a first crossbar fixedly attached to an upper portion of said first securing unit; and
    a second securing unit that includes (a) two attachment units, each attachment unit having a lower portion with a substantially U-shaped cross-section that detachably affixes to a top portion of one sidewall and (b) a second crossbar extending between the attachment units,
    wherein,
    the first and second crossbars are parallel to each other when the first and second securing units are mounted on the wagon,
    each of the first crossbar and the second crossbar accommodates a first clamping unit or a second clamping unit of a mounting assembly on the infant carrier, the first and second clamping units being separated by a distance,
    a distance between the first securing unit and the second securing unit is adjusted by sliding both attachment units along the top portion of the sidewalls of the wagon to match the distance between the first clamping unit and the second clamping unit of the mounting assembly on the infant carrier.

2. The apparatus according to claim 1, wherein the infant carrier is a car seat.

3. The apparatus according to claim 1, wherein the first crossbar is separated into two sections.

4. A method for releasably mounting an infant carrier to a wagon having a bottom wall, side walls supported at opposite lateral edges of the bottom wall and end walls supported at opposite end edges of the bottom wall, the method comprising the steps of:
    detachably affixing a lower portion of a first securing unit having a substantially U-shaped cross-section to a top portion of one end wall of said wagon, the first securing unit having a first crossbar fixedly attached to an upper portion of said first securing unit ;and detachably affixing two attachment units of a second securing unit each having a lower portion with a substantially U-shaped cross-section to a top portion of one sidewall, a second crossbar extending between the attachment units, each of the first crossbar and the second crossbar accommodates a first clamping unit or a second clamping unit of a mounting assembly on the infant carrier, the first and second clamping units being separated by a distance; and adjusting a distance between the first securing unit and the second securing unit by sliding both attachment units along the top portion of the sidewalls of the wagon to match the distance between the first clamping unit and the second clamping unit of the mounting assembly on the infant carrier wherein, the first and second crossbar are parallel to each other when the first and second securing units are mounted on the wagon.

* * * * *